United States Patent [19]

Tolley et al.

[11] Patent Number: 4,479,284
[45] Date of Patent: Oct. 30, 1984

[54] CRAB PROCESSING MACHINE

[75] Inventors: Calvert B. Tolley; Andrew T. Tolley, both of Wingate, Md.

[73] Assignee: Sea Savory, Inc., Cambridge, Md.

[21] Appl. No.: 431,285

[22] Filed: Sep. 30, 1982

Related U.S. Application Data

[63] Continuation-in-part of Ser. No. 169,150, Jul. 15, 1980, Pat. No. 4,380,094.

[51] Int. Cl.³ ............................................. A22C 29/02
[52] U.S. Cl. .......................................... 17/71; 17/48
[58] Field of Search .................. 17/71, 52, 53, 48, 58; 198/654

[56] References Cited

U.S. PATENT DOCUMENTS 710,912  10/1902  Farmer ..................................... 17/58
1,116,082 11/1914  Lamoreaux ............................. 17/58
1,119,104 12/1914  Mohr ..................................... 17/58 X
1,217,809  2/1917  Nicholson .............................. 17/58
3,596,310  8/1971  Tolley ................................... 17/71 X Primary Examiner—Willie G. Abercrombie
Attorney, Agent, or Firm—Scrivener, Clarke, Scrivener and Johnson

[57] ABSTRACT

A machine for producing crab bodies ready for meat removal comprises means for transporting cooked hard crabs to a first station at which the carapace is centrally cut and the claws, walking legs and swimming legs are removed, then to a station at which the parts of the carapace are loosened and then removed laterally of the crab body as trash, and then to a final processing station at which the crab body is held and cleaned by water jets and specially formed brushes.

12 Claims, 11 Drawing Figures

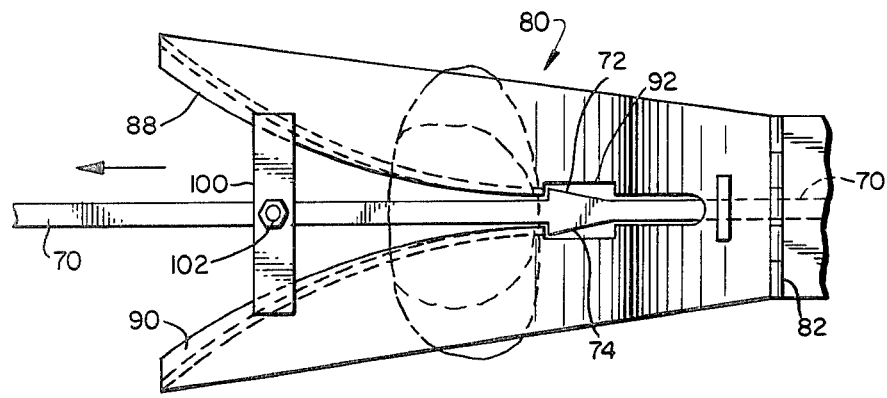
FIG. 5.
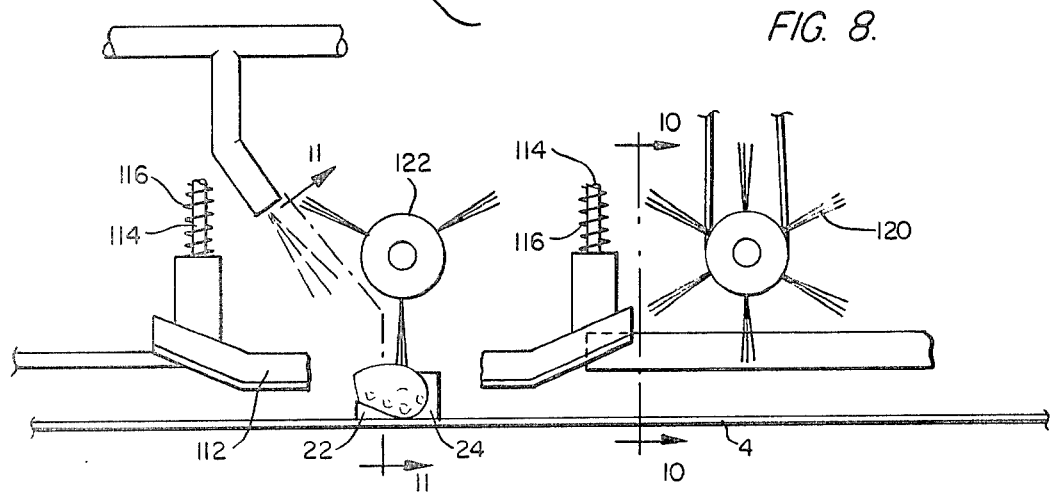
FIG. 7.
FIG. 8.

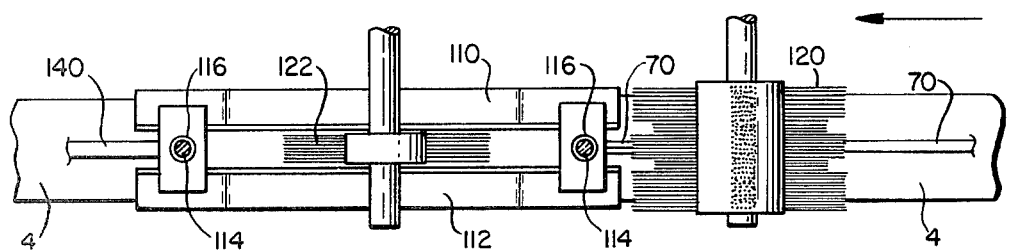
FIG. 9.
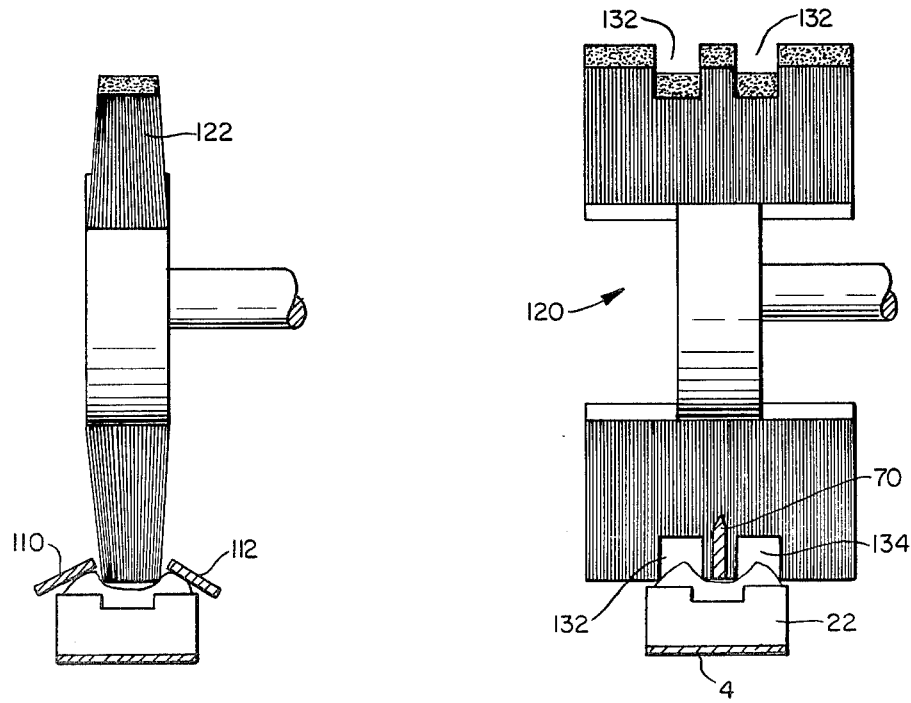
FIG. 11.
FIG. 10.

4,479,284

CRAB PROCESSING MACHINE

RELATION TO OTHER CASES

This application is a continuation-in-part of our co-pending application Ser. No. 169,150 filed July 15, 1980, for Crab Processing Machine, now U.S. Pat. No. 4,380,094.

SUMMARY OF THE INVENTION

A machine is provided for preparing cooked crabs for further processing to remove meat, by removing the carapace, legs, claws and flippers. Each crab is supported by a holder on which it is moved by an endless chain through a first work station at which the crab body is sawed to separate the carapace into lateral parts and remove the legs, claws and flippers, then to a second work station at which the parts of the carapace are spread and removed, and then to a third work station at which the crab body is cleaned by specially constructed scrubbing brushes and is washed by water sprays. Means are provided for firmly holding each crab on its holder throughout its passage through the work stations of the machine.

DESCRIPTION OF THE DRAWINGS

FIGS. 4, 5, 6 and 7 are, respectively, side, top sectional and perspective views of the means provided for spreading and removing the carapace, FIG. 6 being taken on line 6—6 of FIG. 4;

FIGS. 8 and 9 are respectively side and top views of the means at Station C for cleaning the crab body, and FIGS. 10 and 11 are sectional views taken, respectively, on lines 10—10 and 11—11 of FIG. 8.

DESCRIPTION OF THE INVENTION

The machine provided by the invention comprises means for individually moving cooked crabs to and through successive stations at which different operations are performed, resulting in the production of a crab body from which the carapace, claws, walking legs, swimming legs and viscera have been removed and which has been washed and scrubbed, leaving a body from which only the removal of the meat remains to be performed.

The basic parts of the machine are an elongated supporting frame, a plurality of work stations spaced along the length of the frame, an endless chain or belt continuously traveling throughout the length of the frame to successive work stations A to D and a discharge station E, a plurality of crab holders or platforms carried by and spaced along the length of the endless chain, and operating means at each work station to perform one or more operations on the crab supported on each holder.

Figure 1:
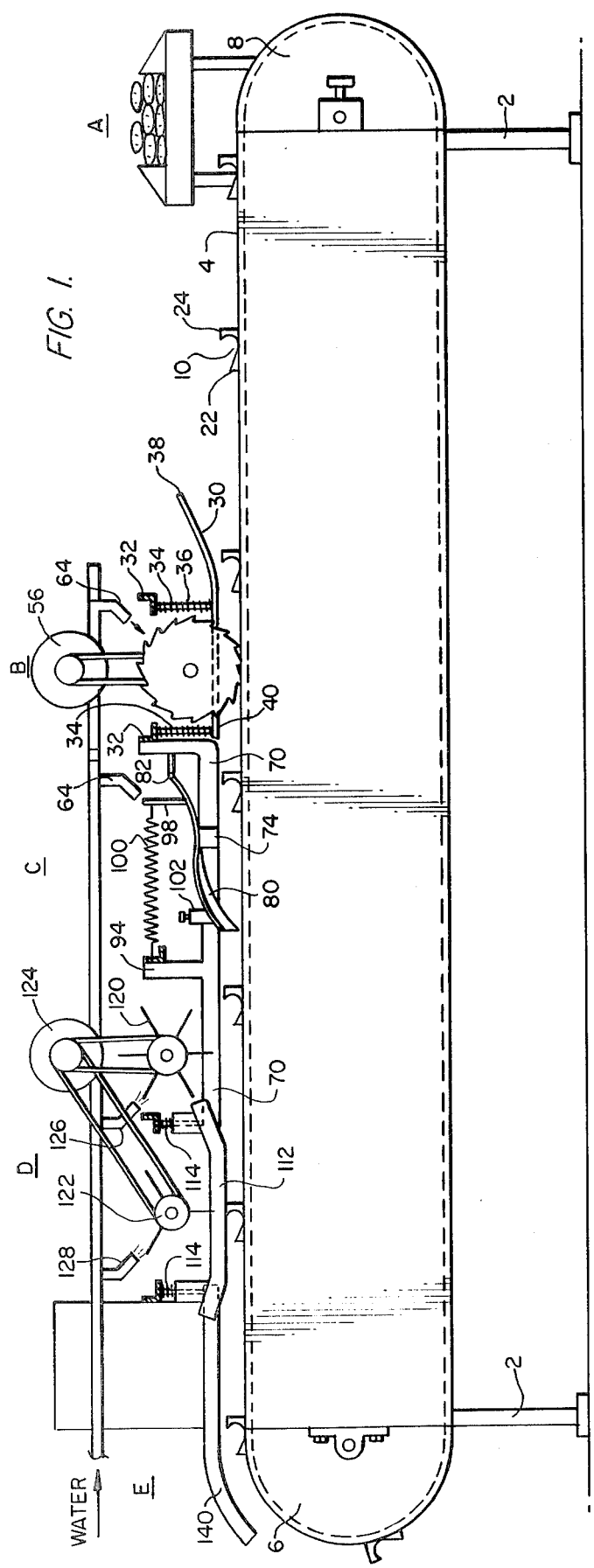
FIG. 1 is a side view of the crab processing machine provided by the invention.
Figure 2:
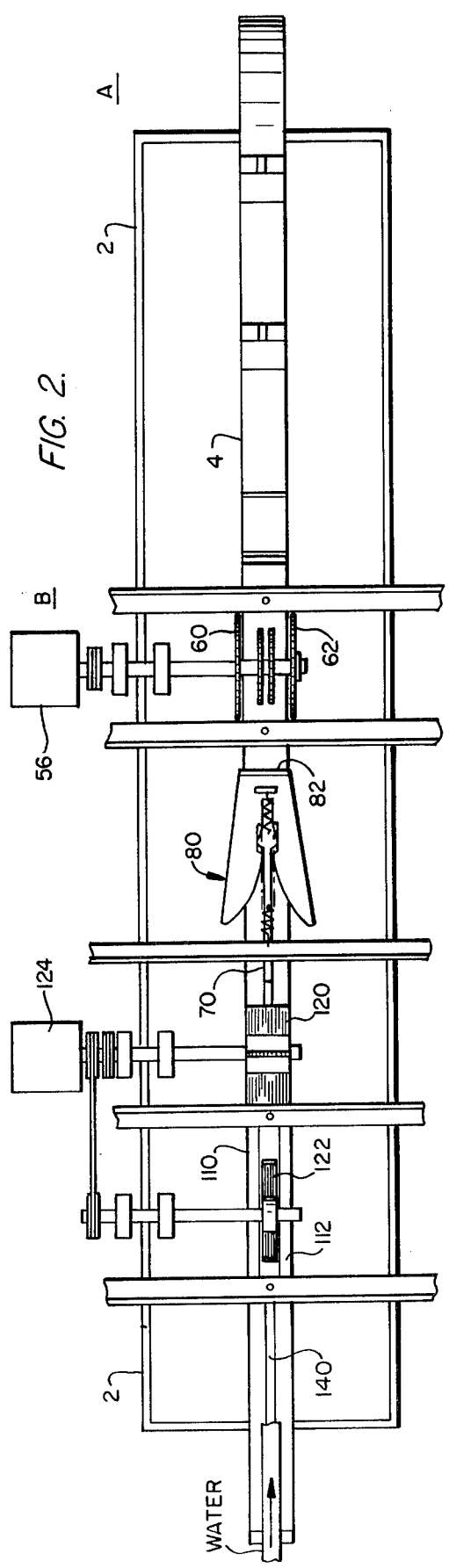
FIG. 2 is a top view of the machine.

The machine frame is shown generally at 2 in FIGS. 1 and 2 and may be of any size and configuration necessary to properly support the operating parts which form the invention.

The transport part of the machine comprises an endless chain 4 which is trained over two spaced sprocket wheels 6, 8 which are supported at opposite ends of the machine frame and are driven by any suitable means. The upper reach of this belt passes from a loading station A at one end of the machine, through work station B, C, D at which successive operations are performed, to a delivery station E at the other end of the machine, from which the crab bodies pass for further processing by removal of the meat.

The loading station A is located adjacent and on the downstream side of the sprocket wheel at the loading end of the machine. Empty crab holders 10 carried by belt 4 arrive at this station and are filled, for example by workers, from trays on which cooked crabs are piled, each holder carrying one crab to the successive downstream work stations.

From the loading station each holder with the complete, uncut crab carried thereby is moved first to a station B where two sets of saws cut the carapace in half and simultaneously remove the claws, walking legs and swimming legs from each end of the crab, and enter and partially clean the visceral cavity. Each crab is then moved to a station C where the halves of the carapace are moved laterally outwardly and then completely removed from the crab body as waste. The crab body is then carried by its holder to a station D at which it is subjected to rotary brush means and water sprays to clean it and remove any trash and debris. After processing at this station the holder passes about the sprocket wheel at the delivery end of the machine and releases the crab body.

The Articulated Crab Holder

As shown in FIGS. 1 and 2, a plurality of crab holders 10 are mounted on the endless chain 4 and are suitably spaced along its length, each holder being constructed and intended to support one crab throughout its passage through the successive work stations of the machine. In the form illustrated in this specification each holder comprises parts 22, 24 which are separately connected to the chain 4 in close downstream-upstream relation to provide a platform supporting a crab body without clamping it, and which releases the crab body at the discharge station of the machine. In order to permit proper and intended operation of the machine apparatus at the successive work stations each crab is placed on the holder with the carapace facing upwardly with the flippers, legs and claws outside the side walls of the holder.

The crab holders we have invented have configurations which firmly seat many different species of crabs, and these holders are described and claimed in our co-pending application for U.S. Pat. No. 431,284, filed on Sept. 30, 1982.

Operations at Station B

Means are provided at the first station after the crabs are loaded onto the holders for holding each crab body firmly on its crab holder, cutting the carapace in half longitudinally of the body, cutting off the flippers, legs and claw at each side of the body and preliminarily cleaning the visceral cavity. These means, which are provided at Station B, are shown generally in FIGS. 1 to 7 and comprise, first, an elongated plate or sled 30 which is positioned above and parallel to the belt 4 and is supported on the machine frame at 32 by upstream and downstream bolts 34 each of which is surrounded by a compression spring 36 which bears downwardly on the sled. At its upstream end the sled is upwardly curved as shown at 38 in order to freely admit and accommodate the crab body entering the station on a crab holder. Downstream of this upwardly curved entering part 38 the sled is provided with a part 40 which is positioned vertically above and parallel to the upper surface of the belt by such a distance that the sled is forced downwardly onto the crab body by springs 34, thus firmly holding each crab body in position on its holder while the operations at Station B are performed.

Between the ends of the sled 30 and extending through an opening 42 between its side edges, the machine is provided with two parallel vertical circular saws 52 which are mounted on and rotated by a horizontal shaft 54 which is rotated by a motor 56 through a belt or other connection. These two saws are positioned closely adjacent each other above the longitudinal center line of the belt 4, the sled 30 and the crab holder 22, 24 so that as each crab and its holder approach and engage the two saws the carapace will be cut longitudinally and centrally of the crab body, and in so doing the lower parts of the saws will entend into the visceral cavity, partially cleaning the same. Several teeth of both saws 52 are set inwardly as shown at 55 and operate to remove the narrow piece of the carapace between the cuts made by saws 52, and all material removed from the visceral cavity will be flushed away by water sprays directed onto the crab body from nozzles at 64.

Figure 3:
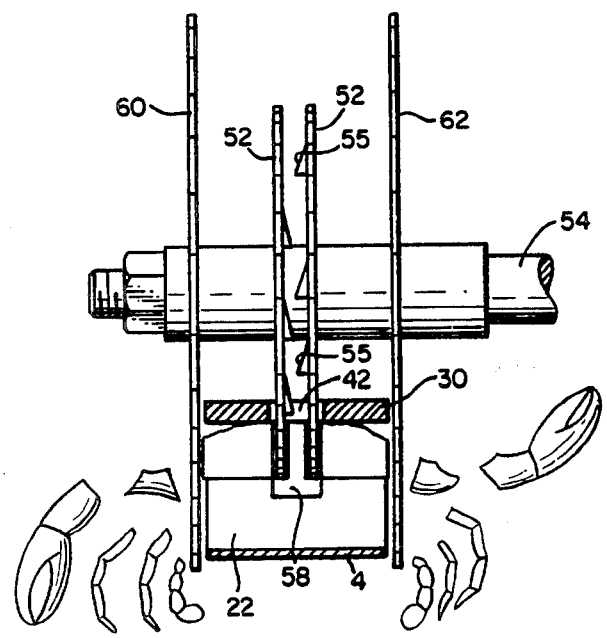
FIG. 3 is an end view of the saws at Station A, showing their operation.

Also mounted on shaft 54 are two additional circular saws 60, 62 which are located outside and parallel to the central saws 52 and are positioned to cut off the legs, flippers and claw at each side of the crab body, as shown in FIG. 3.

During its movement through station B the downward pressure exerted by the sled 30 will cause the crab body to be held in the specially formed surfaces of the crab holder in exact position to be operated on.

Operations at Station C

Means are provided downstream of Station B for spreading the cut halves of the carapace transversely of the machine and removing them entirely from the crab body, and these means are provided at Station C of the machine and are generally disclosed in FIGS. 1 and 2 and more specifically in FIGS. 4 to 7.

Figure 6:
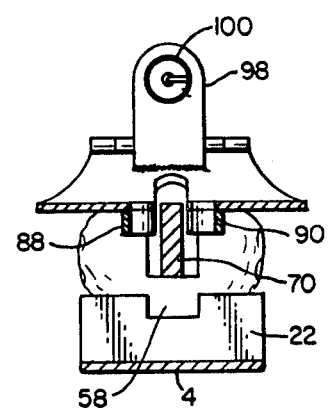

The means at Station C comprise, first, an elongated bar 70 which extends longitudinally of the machine and midway of the side edges of the belt and sufficiently above the upper reach of the belt so that as each crab body moves into this station the bar enters the central cut in the carapace and the visceral cavity and locks the crab body in place on its holder. This bar is narrow transversely of the machine and of greater height than thickness to permit this, all as shown in FIG. 6. Just downstream of the entrance to Station C the side walls of the bar are provided with preferably integrally formed surfaces 72, 74 which extend preferably over the entire vertical extent of the bar in alignment transversely of the bar, and which diverge in a downstream direction. These surfaces need not be of great length longitudinally of the bar, and good results are produced if they entend approximately one inch along each side of the bar. Their function is to produce an initial separation of the two parts of the centrally cut carapace by moving the two parts in opposite outward directions transversely of the belt and machine as the edges of the cut carapace move over them, thus preparing the carapace parts for total removal by other means located downstream at Station C.

Such means are provided by a device known as a plow, which is particularly disclosed in FIG. 7 and is disclosed at 80 in FIGS. 1, 2 and 4 to 6 in relation to other parts of the machine. The plow is a unitary rigid device preferably made of metal which extends longitudinally of the belt and is pivotally supported at 82 at the upstream end of Station C so that downstream of its pivotal support it may float vertically. Downstream of its pivotal support the plow is formed with laterally flared forwardly extending side members 84, 86 the inner edges of which are provided with downwardly extending flanges 88, 90. The space between the side members is enlarged at 92 to receive the diverging surfaces 72, 74 on the sides of the bar 70.

Figure 4:
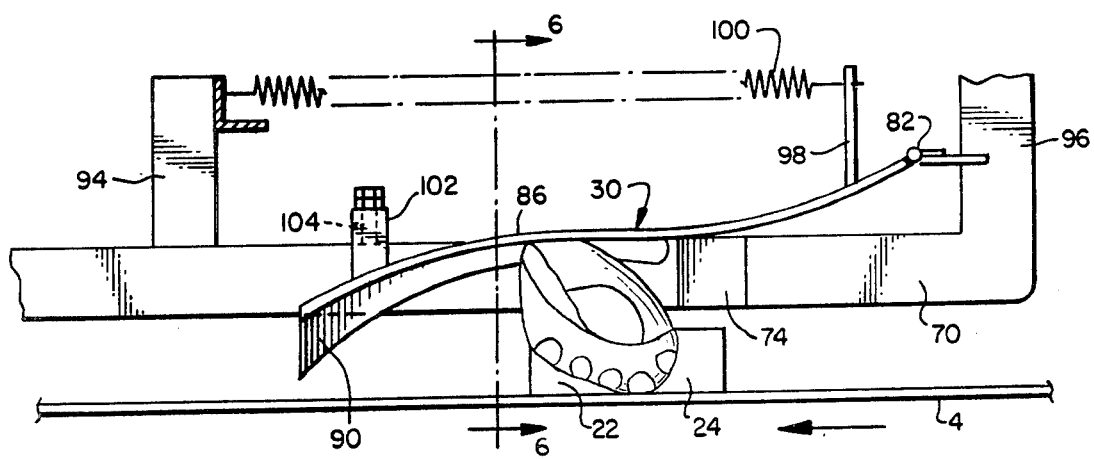

As particularly shown in FIG. 4 the bar 70 is provided with vertically upstanding parts 94, 96 on one of which, 96, the upstream end of the plow is pivotally mounted at 82. Adjacent the same end the plow is provided with an upstanding pin 98 to which one end of spring 100 is connected, the other end being connected to the upstanding bar part 94 so that the plow is constantly urged downwardly toward the bar 70 about its pivotal support. Such movement of the plow is limited by a strap 102 which extends between and above the side members of the plow and has a vertical adjusting screw 104 positioned vertically above the bar 70 which permits adjustment of the vertical position of the plow with respect to the bar 70.

As particularly shown in FIG. 1 the bar 70 extends beyond the downstream end of Station C into the next work station of the machine, which is Station D, thus maintaining downward pressure on each crab body as it moves into Station D to insure that each crab body is seated firmly and properly in its holder.

Operations at Station D

Means following bar 70 are provided at this station for resiliently holding each crab body on its holder and for scrubbing and flushing each crab body as it passes through the work station. As particularly disclosed in FIG. 1 the bar 70 terminates just downstream of the entrance to Station D where its holding function is taken over by two bars 110, 112 which are positioned above the side edges of the belt 4 and are upwardly convergent and are positioned to engage the upper and outer edge of each crab body. Each bar is supported at each end on the lower end of a rod 114 which is constantly urged downwardly by a spring 116 whereby the bars resiliently press on the side sections of the crab body to securely hold each body on its holder. The entrance and exit ends of each bar 110, 112 are upwardly flared to facilitate movement of the crab bodies to and from the station, and the bar 70 terminates within the upwards flared entrance ends of the bars as shown in FIGS. 1 and 9.

Means are provided at this station for scrubbing and flushing each crab body, and such means comprises upstream and downstream rotary brushes 120, 122, respectively, which are driven by a motor 124, and water jet means 126, 128 which are, respectively, directed to the areas of contact between the brushes and the visceral cavity of each moving crab body. Each of the brushes is constructed to provide a special scrubbing action to insure complete removal of all debris from the crab body. To this end, and as shown in FIG. 10, the upstream brush 120 comprises a plurality of brush tufts, preferably six to 12, extending radially outwardly from the hub, each brush being rectangular in radial section and having two circumferentially extending rectangular groves 132 in its outer surface, which are so positioned on opposite sides of the radial center line of the brush that the top tips 134 of the crab body are received within them, thus preventing abuse of these tips by the rotating brushes.

The bar 70 terminates downstream of the brush 120 and in the area of this brush its upper edge is sharpened as shown in FIG. 10 causing the brush parts between the grooves 132 to be pushed laterally outwardly to cause better cleaning of the sides of the visceral cavity.

The downstream brush 122 preferably has a plurality of tufts, preferably six to 12, each of which is of trapezoidal radial shape with outwardly converging sides as shown in FIG. 11, so that the radially outward end of each of the tufts will scour the visceral cavity and remove any debris disloged by the upstream brush.

We have found that good results are produced if the upstream brush 120 is four inches wide and the downstream brush is one inch wide at its outer periphery.

Station E

As each cleaned crab body passes from Station D it moves from under the bars 110, 112 and passes under an elongated bar 140 which has the same configuration as bar 70 and is aligned with it, and which holds the crab body on the holder until the body and holder pass around the sprocket wheel 6 at the delivery end of the machine, where the crab body falls by gravity from its holder.

Operation

As each crab body on its holder moves from loading Station A on the traveling belt it passes first under the sled 30 which resiliently holds the crab body on its holder. The central saws at Station B cut the carapace centrally between the ends of the crab body and remove the narrow piece of carapace between them, and at the same time the outer saws remove the claws, flippers, walking legs and the ends of the carapace. The crab body then moves to Station C where the bar 70 enters the central saw cut of the carapace and the diverging surfaces 72, 74 on the bar are engaged by the side edges of the central saw cut to disengage the two parts of the carapace from the crab body. Further movement of the crab body causes the edges of the central cut to engage the diverging surfaces 88, 90 of the plow thus completely removing the two parts of the carapace from the crab body and permitting them to fall away as trash. While still being locked in place by bar 70 each crab body then moves to Station D where the bars 110, 112 engage the side meat containing mounds and resiliently urge the crab body downwardly onto the holder so that the vigorous scrubbing provided by the two brushes at this station will not dislodge the crab body from the holder. The upstream brush is provided in its peripheral surface with grooves which are positioned to protect the top tips at the sides of the crab body, while the downstream brush is shaped to enter the visceral cavity more closely and remove all debris. Jets of water are provided at any and all stations to assist in cleaning the body and removing the debris.

We claim:

1. A machine for processing various species of crabs to produce cleaned crab bodies ready for meat removal, comprising an elongated supporting frame, at least three work stations spaced along the length of the machine, an endless chain supported on vertical rotating support and driving wheels at the loading and delivery ends of the frame and having an elongated section passing through the work stations, a plurality of crab holders mounted on said belt and spaced along the length thereof,
   (a) the means at the first work station comprising means for:
      i. holding the crab body in position on its holder,
      ii. sawing through the carapace of the crab body longitudinally of the crab body and centrally of its ends,
      iii. sawing through both ends of the crab body to remove the claws, flippers, walking legs and ends of the carapace from the crab body, and
      iiii. cleaning the visceral cavity,
   (b) an elongated bar extending from the downstream side of the first work station throughout the second and third work stations,
   (c) the means at the second work station comprising:
      i. means on the elongated bar positioned in the path of movement of the central cut in the carapace for moving the side parts of the carapace transversely of the machine for initially separating the part of the carapace from the crab body, and
      ii. means mounted on a horizontal pivot positioned above the bar and having diverging arms extending from the pivot to opposite sides of the bar, each arm having a vertical flange positioned to engage a side edge of the central cut of the carapace for moving the side parts of the carapace transversely to complete their removal from the crab body,
   (d) the means at the third work station comprising:
      i. means for holding the crab body in position on its holders, and
      ii. upstream and downstream brushes for cleaning the visceral cavity of each crab body.

2. A crab processing machine according to claim 1 in which the first means at the second work station for moving the parts of the carapace comprises surfaces formed on the side surfaces of the bar and extending outwardly therefrom and diverging from each other in the downstream direction to engage the edges of the central saw cut in the carapace.

3. A crab processing machine according to claim 2 in which the second means at the second work station for moving the parts of the carapace is positioned downstream from the first means and from the diverging surfaces on the bar, and has surfaces aligned with the surfaces on the bar and diverging outwardly and downwardly in the downstream direction for moving the cut parts of the carapace from the crab body.

4. A crab processing machine according to claim 3, in which the second means is pivotally mounted on the machine at its upstream end.

5. A crab processing machine according to claim 4 comprising in addition:
   (a) means for constantly urging the downstream end of the second means toward the belt and the bar, and
   (b) adjustable means for limiting its movement toward the belt and bar.

6. A crab processing machine according to claim 1, in which the holding means at the third work station comprises upwardly converging elongated plates spaced laterally of the belt and positioned to engage the upper surface of each side meat part of each crab body throughout its movement through the work station.

7. A crab processing machine according to claim 1, in which the cleaning means comprises two rotary scrubbing brushes which are positioned upstream and downstream from each other.

8. A crab processing machine according to claim 7, in which the upstream brush has rectangular tufts each of which has in its radial outer surface two circumferentially extending grooves of rectangular cross section which are located on opposite sides of the center line of the tuft, to receive the spaced bony ridges of the crab body to protect them from the rotating brush.

9. A crab processing machine according to claim 7, in which the downstream brush has tufts of radially outwardly converging side edges.

10. A crab processing machine according to claim 1, in which the first sawing means at the first work station comprises two closely spaced parallel rotating circular saws each of which has a plurality of inwardly set teeth.

11. A crab processing machine according to claim 1, in which the elongated bar is of greater height than width and extends throughout the entire second work station and into the third work station, the bar being positioned above the belt sufficiently to enter the visceral cavity of each crab body and engage the bottom of the cavity to lock the crab body to its holder.

12. A crab processing machine according to claim 11, in which the central tufts of the upstream brush at the third work station are positioned on opposite sides of the bar and the upper edge of the bar is sharpened at this location.

* * * * *